United States Patent Office 3,080,419
Patented Mar. 5, 1963

3,080,419
1-METHYL-3-PHENYLINDENE-1-
CARBOXYLIC ACID
Alain Marie Horeau, Sceaux, and Abram Becker, Paris,
France, assignors to Société des Usines Chimiques
Rhône-Poulenc, Paris, France, a body corporate of
France
No Drawing. Filed Dec. 22, 1959, Ser. No. 861,187
Claims priority, application France Dec. 29, 1958
2 Claims. (Cl. 260—515)

This invention relates to indene derivatives.
The new indene derivatives of the present invention have the formula:

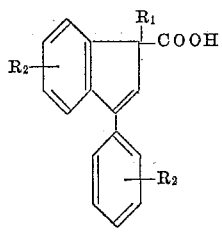

I where $R_1$ represents a hydrocarbon group which may be substituted and $R_2$ represents hydrogen or one or more substituents attached to the benzene nucleus. Preferably $R_1$ is a lower alkyl group and $R_2$ hydrogen. 1-methyl-3-phenylindene-1-carboxylic acid is especially preferred.

The indene derivatives of Formula I are useful as intermediates for the preparation of compounds of therapeutic utility. They can, for example, be readily decarboxylated to give indenes of the formula:

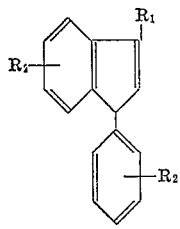

II where $R_1$ and $R_2$ are as hereinbefore defined. The use of indenes of Formula II in the synthesis of pharmaceutical products has already been described.

According to a feature of the invention the indenes of Formula I are prepared by reaction of a 1,1-diphenylethylene of the formula:

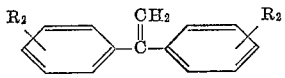

III with a α-ketocarboxylic acid of the formula:

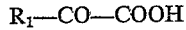

(where $R_1$ and $R_2$ are as defined above) in the presence of sulphuric acid. The reaction takes place at ambient temperature, but it may be advantageous to heat the mixture slightly in order to increase the speed of reaction. The product of the reaction is thereafter isolated by application of known methods.

The compounds of Formula III are prepared by the decarbonylation and dehydration for example with sulphuric acid as indicated by Bistrzycki in Berichte, 38 (1905), pages 839–845, of a diarylpropionic acid of the formula:

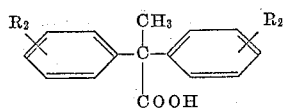

IV

The temperature conditions may vary a little depending upon the acid to be decarbonylated, but the reaction generally takes place at +10° C. as indicated by Bistrzycki in the case of 2,2-diphenylpropionic acid.

The 2,2-diarylpropionic acids of Formula IV may be prepared in various ways, more especially by Böttinger's process [Berichte, 14 (1881), 1595], that is to say, by the reaction of pyruvic acid with an aromatic hydrocarbon derivative of formula:

V in the presence of an agent such as sulphuric acid or aluminium chloride, the reaction being carried out at low temperature, preferably below 0° C.

The derivatives of Formula I where $R_1$ is methyl are directly prepared in accordance with a further feature of the invention, by the action of pyruvic acid on an aromatic hydrocarbon derivative of Formula V in the presence of sulphuric acid at room temperature. At this temperature, the 2,2-diarylpropionic acid is converted, as it is produced, into a 1,1-diarylethylene, which reacts immediately with more pyruvic acid to give finally, in very good yields, an indene derivative of the formula:

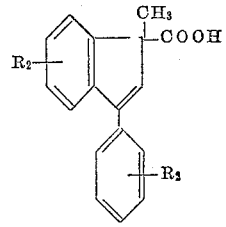

VI

The following examples illustrate the invention.

*Example I*

To 500 cc. of concentrated sulphuric acid are added 22 g. of pyruvic acid and then 120 cc. of benzene, and the mixture, which is initially heterogeneous, is vigorously agitated. An abundant evolution of carbon monoxide takes place fairly rapidly while the temperature rises. At the end of two and a half hours, the evolution of gas has become very slow. The solution, which is then homogeneous, is left at ambient temperature for 20 hours, whereafter it is poured on to 1500 g. of ice. A magma is formed, which gradually crystallises and is then suction-filtered. There are thus obtained 20 g. of product. By salting out the mother liquors with sodium sulphate, 4 g. more of product are recovered. The whole of the product obtained, i.e. 24 g. is recrystallised from 100 cc. of petroleum ether, and 22.2 g. of 1-methyl-3-phenylindene-1-carboxylic acid, M.P. 124° C., are obtained.

*Example II*

The procedure of Example I is followed, except that the product which remains in solution in the mother liquors is recovered by three extractions with ether. There are thus obtained 28.7 g. of crude product, recrystallisation of which from petroleum ether gives 26 g. of pure product similar to that obtained in Example I.

*Example III*

5 g. of diphenylethylene and 5 g. of pyruvic acid are successively dissolved in 125 cc. of pure sulphuric acid, and the product is left for 16 hours, whereafter it is poured on to 500 g. of ice with agitation, and the crude product is suction-filtered. It is dissolved in 100 cc. of 10% sodium hydroxide and then extracted with 50 cc. of ether and thereafter with 50 cc. of cyclohexane. The aqueous solution is then acidified with 150 cc. of 10% sulphuric acid and there are obtained 6.2 g. of 1-methyl-3-phenyl-indene-1-carboxylic acid, which is similar to that of Example I.

The constitution of the product obtained in Example I, II and III is shown by the following data as well as the usual analysis, percentage composition and molecular weight: the existence of a carboxyl group; the existence of a double bond which can be determined with bromine, is readily hydrogenizable and not conjugated with the carboxyl group (as shown by the infra-red spectrum of the product). On the other hand, the product is converted by decarboxylation into 1-phenyl-3-methylindene, identical with that obtained by the reaction of methylmagnesium iodide with 3-phenylindanone followed by a dehydration of the alcohol thus obtained.

The decarboxylated compounds of Formula II have a mobile hydrogen atom viz. that attached to the same carbon atom as $R_1$. They can be caused to react with aminohalogenoalkanes in the presence of alkaline condensing agents to give compounds of formula:

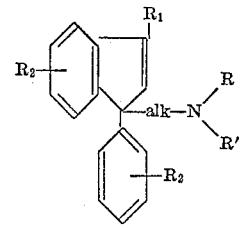

VII having spasmolytic and vasodilatory properties.

We claim:
1. 1-methyl-3-phenylindene-1-carboxylic acid.
2. Process for the preparation of 1-methyl-3-phenyl-indene-1-carboxylic acid which comprises reacting together pyruvic acid and 1,1-diphenylethylene in the presence of sulphuric acid at ambient temperature and isolating the acid formed.

References Cited in the file of this patent

Bottinger: "Ber. Deut. Chem.," volume 14, January–June 1881, pages 1595–1598.
Blum-Bergmann: C.A., volume 25, page 1517 (1931).
Blum-Bergmann: C.A., volume 26, page 1923 (1932).
Goebel et al.: C.A., volume 27, page 5072 (1933).
Koelsch et al.: C.A., volume 35, page 7395 (1941).